(12) United States Patent
Wu et al.

(10) Patent No.: US 10,893,310 B1
(45) Date of Patent: Jan. 12, 2021

(54) MANAGING PLAYBACK BITRATE SELECTION

(71) Applicant: Amazon Technologies, Inc., Seattle, WA (US)

(72) Inventors: Yongjun Wu, Bellevue, WA (US); Sitaraman Ganapathy, Issaquah, WA (US); Zhi Xu, Snohomish, WA (US); Lovish Dhawan, Bothell, WA (US); Ivan Yeo, Seattle, WA (US); Yashodhan Gokhale, Seattle, WA (US); Jed Hoffmann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 16/427,807

(22) Filed: May 31, 2019

(51) Int. Cl.
| | |
|---|---|
| *H04N 21/238* | (2011.01) |
| *H04N 21/239* | (2011.01) |
| *H04N 21/235* | (2011.01) |
| *H04N 21/2343* | (2011.01) |
| *H04N 21/2387* | (2011.01) |
| *H04N 21/2187* | (2011.01) |
| *H04N 21/6587* | (2011.01) |
| *H04N 21/24* | (2011.01) |
| *H04N 21/2747* | (2011.01) |

(52) U.S. Cl.
CPC ..... *H04N 21/2387* (2013.01); *H04N 21/2187* (2013.01); *H04N 21/2353* (2013.01); *H04N 21/2393* (2013.01); *H04N 21/23439* (2013.01); *H04N 21/2402* (2013.01); *H04N 21/2747* (2013.01); *H04N 21/6587* (2013.01)

(58) Field of Classification Search
CPC ........... H04N 21/2387; H04N 21/2393; H04N 21/2353; H04N 21/23439; H04N 21/2187; H04N 21/2402; H04N 21/2747; H04N 21/234345; H04N 21/440218; H04N 19/115; H04N 21/6587
See application file for complete search history.

(56) References Cited

U.S. PATENT DOCUMENTS

| | | | | |
|---|---|---|---|---|
| 2015/0088965 | A1* | 3/2015 | Pakulski | H04L 65/4092 709/203 |
| 2015/0296274 | A1* | 10/2015 | Good | H04N 21/26258 725/93 |
| 2018/0035176 | A1* | 2/2018 | Stockhammer | H04L 67/146 |
| 2018/0176623 | A1* | 6/2018 | Nugent | H04N 21/6547 |
| 2020/0145701 | A1* | 5/2020 | Liu | H04N 9/8205 |

* cited by examiner

*Primary Examiner* — Mulugeta Mengesha
*Assistant Examiner* — Alazar Tilahun
(74) *Attorney, Agent, or Firm* — Weaver Austin Villeneuve & Sampson LLP

(57) ABSTRACT

Techniques enabled by the present disclosure allow a media content service to support different playback modes in the presence of variations in media content asset types and viewer device capabilities. The techniques enabled by the present disclosure further allow encoding media content with playback bitrates targeted for streaming playback mode and playback bitrates targeted for download playback mode, and managing manifest data to allow viewer devices to select between different playback bitrates for a particular playback mode with greater precision.

20 Claims, 8 Drawing Sheets

```
...
        <Representation width="512" scanType="progressive" sar="1:1" id="video=120000" height="288" frameRate="24000/
        1001" codecs="hev1.1.6.L63.90" bandwidth="120000">
605     <BaseURL>guid_video_3.mp4</BaseURL>
        <PlaybackMode>
        <SupportedMode>Download</SupportedMode>
        <SupportedMode>Streaming</SupportedMode>
        </PlaybackMode>
        <SegmentList duration="101178" timescale="24000">
        <Initialization range="0-1665"/>
        <SegmentURL mediaRange="9150-48905"/>
        ...
        </SegmentList>
        </Representation>
        ...
        <Representation width="1280" scanType="progressive" sar="1:1" id="video=1800000" height="720" frameRate="24000/
        1001" codecs="hev1.1.6.L93.90" " bandwidth="1800000">
610     <BaseURL>guid_video_10.mp4</BaseURL>
        <PlaybackMode>
        <SupportedMode>Download</SupportedMode>
        </PlaybackMode>
        <SegmentList duration="101178" timescale="24000">
        <Initialization range="0-1665"/>
        <SegmentURL mediaRange="9150-130228"/>
        ...
        </SegmentList>
        </Representation>
        ...
        <Representation width="1280" scanType="progressive" sar="1:1" id="video=1950000" height="720" frameRate="24000/
        1001" codecs="hev1.1.6.L93.90" " bandwidth="1950000">
615     <BaseURL>guid_video_12.mp4</BaseURL>
        <PlaybackMode>
        <SupportedMode>Streaming</SupportedMode>
        </PlaybackMode>
        <SegmentList duration="101178" timescale="24000">
        <Initialization range="0-1665"/>
        <SegmentURL mediaRange="9150-140946"/>
        ...
        </SegmentList>
        </Representation>
        ...
```

*FIGURE 6A*

```
...
<Representation width="512" scanType="progressive" sar="1:1" id="video=120000" height="288" frameRate="24000/1001" codecs="hev1.1.6.L63.90" bandwidth="120000">
<BaseURL>guid_video_3.mp4</BaseURL>
<SegmentList duration="101178" timescale="24000">
<Initialization range="0-1665"/>
<SegmentURL mediaRange="9150-48905"/>
...
</SegmentList>
</Representation>
...
<Representation width="1280" scanType="progressive" sar="1:1" id="video=1800000" height="720" frameRate="24000/1001" codecs="hev1.1.6.L93.90 " bandwidth="1800000">
<BaseURL>guid_video_10.mp4</BaseURL>
<SegmentList duration="101178" timescale="24000">
<Initialization range="0-1665"/>
<SegmentURL mediaRange="9150-130228"/>
...
</SegmentList>
</Representation>
...
```

*FIGURE 6B*

| Codec | Data Saver | Good | Better | Best |
|---|---|---|---|---|
| UHD Resolution | | | | |
| AVC | 100 | 3000 | 8000 | Uncapped |
| HEVC | 120 | 1950 | 5000 | Uncapped |
| HD Resolution | | | | |
| AVC | 100 | 500 | 3000 | 10000 |
| HEVC | 120 | 450 | 1950 | 5000 |
| SD Resolution | | | | |
| AVC | 100 | 500 | 800 | 2400 |
| HEVC | 120 | 450 | 650 | 1000 |

*FIGURE 7A*

| Codec | Data Saver | Good | Better | Best |
|---|---|---|---|---|
| UHD Resolution | | | | |
| AVC | 100 | 3000 | 8000 | Uncapped |
| HEVC | 120 | 1950 | 5000 | Uncapped |
| HD Resolution | | | | |
| AVC | 100 | 500 | 3000 | 6500 |
| HEVC | 120 | 450 | 1800 | 2800 |
| SD Resolution | | | | |
| AVC | 100 | 500 | 800 | 2400 |
| HEVC | 120 | 450 | 650 | 1000 |

*FIGURE 7B*

```
val selectedMaxBitrate
val maximumHeight
val maximumWidth
        FOR EACH Representation IN Mpd.Representation []
            RETURN ( CLOSEST Representation.bandwidth TO selectedMaxBitrate
                WHERE Representation.height <= maximumHeight
                    AND Representation.width <= maximumWidth )
```

*FIGURE 7C*

MANAGING PLAYBACK BITRATE SELECTION

BACKGROUND

Consumers are increasingly accessing media content on the move, including in places where network connectivity is unavailable, poor quality, or undesirable (e.g., costs associated with metered connections, security risks associated with public networks, etc.) for the purposes of a streaming playback mode for consuming media content.

Media content services can provide a download playback mode to satisfy customer needs in scenarios such as playback when network connectivity is not available (e.g., during air travel), watching content while traveling outside of a home country (e.g., certain content providers disallow DRM license delivery beyond a country's border, even if there is network connectivity), or for users who choose to completely download media content prior to initiating playback in order to watch the media content based on their preferred viewing experience, irrespective of network connectivity conditions.

In some instances, providing media content encoded for a streaming playback mode in response to a request for download playback results in a degraded customer experience. For example, the image quality of complex scenes may be sacrificed to comply with streaming network bandwidth constraints, even though such constraints are not applicable in the download playback context. As another example, media content encoded for streaming playback can result in larger file sizes without corresponding improvements in quality (e.g., use of constant bitrate encoding that allocates more bits than necessary for a simple scene relative to using variable bitrate encoding), resulting in longer download times that delay initiation of playback of the downloaded media content and more storage space consumption on the viewer device and servers.

A media content provider can provide to a viewer device media content encoded with different sets of parameters targeted for different playback modes. However, the compatibility of deployed versions of logic (e.g., ad insertion algorithms, bitrate selection algorithms, quality to bitrate mapping logic, etc.), especially in the presence of variations in media content (e.g., whether the media content has encodings targeted for a particular playback mode), and variations in viewer devices, requires consideration.

BRIEF DESCRIPTION OF THE DRAWINGS

FIG. 6A illustrates an example of part of master manifest data for a system supporting multiple playback modes for media content.

FIG. 6B illustrates an example of part of filtered manifest data.

FIG. 7A illustrates an example of logic involved in selecting a representation of media content.

FIG. 7B illustrates another example of logic involved in selecting a representation of media content.

FIG. 7C illustrates yet another example of logic involved in selecting a representation of media content.

DETAILED DESCRIPTION

Figure 1:
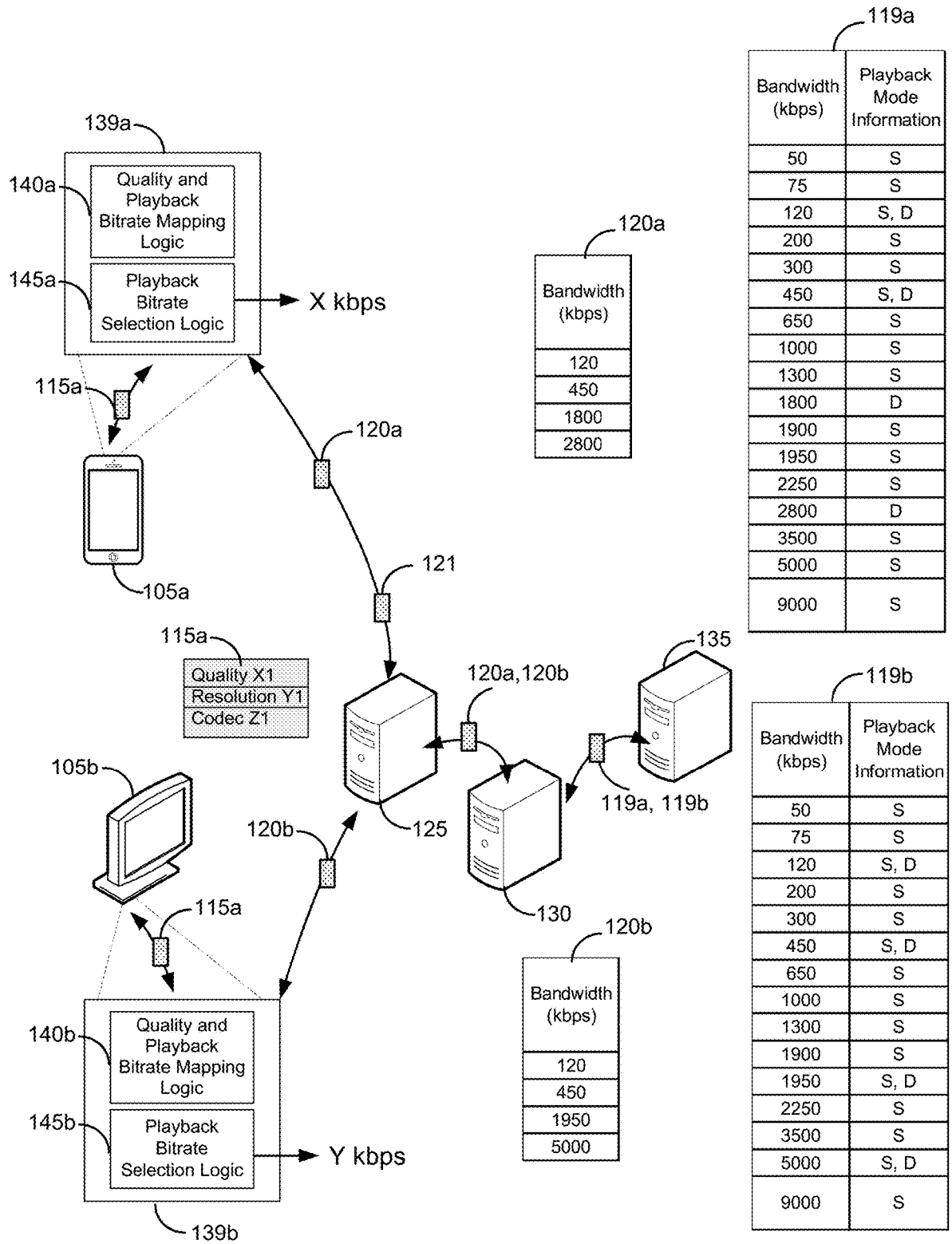
FIG. 1 illustrates an example of a system for supporting multiple playback modes for media content.

Techniques enabled by the present disclosure enable improved support for multiple media content playback modes in a media content service having multiple types of media content assets, and multiple types of viewer device characteristics.

For example, the multiple media content playback modes include a streaming playback mode where playback can begin before an entire movie is downloaded, or a download playback mode where playback begins after the entire movie is downloaded, or other playback modes (e.g., playback modes for testing, playback modes for validation, playback modes for quality assurance, playback modes for research and development, etc.).

The multiple types of media content assets can include "legacy" assets that have a set of representations (e.g., a set of bitrates available for selection) that do not include representations indicated as being specifically for download playback mode, and "enhanced" assets that have certain representations indicated as being specifically for download playback mode.

The multiple types of viewer device capabilities can include different control logic for selecting from within multiple representations available for the requested playback mode (e.g., selecting a specific representation from an "encoding ladder" corresponding to a hierarchy of different quality levels, resolutions, etc.). The control logic for selecting from within multiple representations can include logic for mapping quality levels to bitrate constraints, or logic for selecting a specific bitrate from the encoding ladder based on one or more bitrate constraints. Variations in viewer device capabilities may arise due to different hardware (e.g., smartphone, tablet, laptop computer, large-screen TV, etc.), operating systems, manufacturers, software versions, industry standards (e.g., HTTP Live Streaming (HLS), MPEG-DASH (also referred to as DASH), etc.), abilities to receive updated control logic, and so forth.

In various implementations, techniques enabled by the present disclosure improve the technology of media content distribution by managing manifest data to support rolling out new encodings of media content targeted for different playback modes without requiring certain modifications of previously deployed viewer devices. Certain techniques enabled by the present disclosure also have the practical application of maintaining conformance with industry standards (e.g., HLS, DASH, etc.), or preventing spoofing by viewer devices by executing logic for filtering availability of representations of media content at the server-side, or maintaining compatibility with existing bitrate selection algorithms (e.g., choosing the closest bitrate available in the manifest based on a specified maximum bitrate) or quality level to bitrate mappings, or providing more targeted selection of a particular representation in the manifest data based on a specified constraint (e.g., using a handshake protocol to provide consistency in the presence of "fuzzy" algorithms that can vary in bitrate selection decisions, or to provide precision in the presence of third party APIs that provide limited granularity in bitrate selection, etc.).

In certain implementations, a manifest server can receive data from a viewer device specifying parameters such as, for example, playback mode and a media content title. Based on the media content title, the manifest server can identify manifest data for an enhanced media content asset that includes playback mode information that indicates that certain representations are targeted for download playback, or identify manifest data for a legacy media content asset that does not include playback mode information that indicates that certain representations are targeted for download playback.

The manifest server can filter the identified manifest data based in part on the requested playback mode prior to providing filtered manifest data to the viewer device. A viewer device can use the filtered manifest data, which no longer includes playback mode information for each representation, to generate requests for fragments of a particular representation of the media content. The particular representation selected by the viewer device can be based on a bitrate selection algorithm that uses quality level, video resolution, and video codec as inputs.

In particular implementations, regardless of whether the requested media content title is an enhanced media content asset or a legacy media content asset, or variations in viewer device characteristics (e.g., different quality level to bitrate mappings at the viewer device, etc.), the filtered manifest generated by the manifest server is compatible (e.g., with the same version of a viewer-device side (i.e., "client-side") bitrate selection algorithm, etc.).

An example will be instructive.

FIG. 1 depicts an example of a media content service that supports multiple playback modes.

Depending on the mode of playback, such as streaming playback, download playback, etc., different representations of media content may be better suited for delivery to a consumer of the media content. In certain implementations, associating different representations of media content with different modes of playback can improve the customer experience directly (e.g., download playback may use a representation with encoded content bitrate characteristics providing higher image quality, but would violate network bandwidth constraints for streaming playback), or indirectly (e.g., download playback may use a representation that reduces file sizes, allowing more choices in media content to be provided within a fixed amount of storage space).

Due to practical limitations in media content encoding times, a media content catalog may include a portion with media content with representations targeted for streaming playback and representations targeted for download playback, and a portion with media content without representations targeted for download playback (which in some cases, may be augmented with representations targeted for download playback at a later time).

Furthermore, due to practical limitations in deploying or modifying features in client devices (e.g., a tablet device and/or software application managed by an entity separate from the entity providing media content services), a media content service must ensure compatibility of such "legacy" client devices with both media content with representations targeted for download playback and media content without representations targeted for download playback.

In other words, deploying or improving the customer experience for selecting download playback requires a media content service to accommodate fallback positions for scenarios corresponding to: a "legacy viewer device" without updated control logic for selecting between different representations that is requesting an enhanced media content asset (an asset with representations targeting download playback), or an "enhanced viewer device" with updated control logic for selecting between different representations that is requesting a legacy media content asset (an asset without representations targeting download playback).

As shown in FIG. 1, viewer devices 105a and 105b can receive manifest data such as filtered manifest data 120a and 120b (which can be markup files or other types of data structures) providing playback options for an enhanced media content asset and a legacy media content asset, respectively.

For example, the enhanced media content asset is a popular movie that the media content service has prioritized and therefore generated encodings targeted for download playback. In contrast, the legacy media content asset is an obscure movie with low priority, and therefore lacks encodings targeted for download playback.

In the depicted implementation, filtered manifest data 120a and 120b can be generated by manifest service 130 in communication with media server 125. For example, viewer devices 105a and 105b can each request playback of respective media content by providing requests to media server 125 to download the media content for download playback on viewer devices 105a and 105b. Media server 125 can contact manifest service 130 regarding the requests and manifest service 130 can then generate filtered manifest data 120a and 120b based on master manifest data 119a and 119b, respectively. In certain implementations, manifest service 130 can obtain master manifest data 119a and 119b from a data object storage service (not shown in FIG. 1). Examples of the data object storage service include but are not limited to local storage or cloud storage (e.g., Amazon S3, Google Cloud Storage, Microsoft Azure Storage, IBM Bluemix, etc.). In various implementations, manifest configuration service 135 provides information relating to filtering to manifest service 130. For example, manifest configuration service 135 can provide a hash (e.g., of a filter to be applied) in the URL for when viewer device 105a or 105b requests the playback URLs for the media content.

In the example of FIG. 1, master manifest data 119a and 119b indicate various representations of respective media content, with each representation corresponding to playback of the media content associated with different bitrates (or bandwidth). Master manifest data 119a provides information on the fragments for encodings of the popular movie at 17 different bitrates (e.g., 50 kbps, 75 kbps . . . 5000 kbps, and 9000 kbps). Master manifest data 119b provides information on the fragments for encodings of the obscure movie at 15 different bitrates. The different bitrates can correspond to variations in parameters, such as, for example, resolution (e.g., image width or height), codec settings, and so forth.

Master manifest data 119a and 119b also indicate playback mode information for the various representations of respective media content. For example, master manifest data 119a provides the playback mode information for each of the 17 different bitrates. Specifically, master manifest data 119a includes a first subset of representations with playback mode information indicating that a corresponding playback bitrate is associated with only the download playback mode (e.g., the "D" indicator for the rows for 1800 and 2800 kbps representations), a second subset of representations with playback mode information indicating that a corresponding playback bitrate is associated with only the streaming playback mode (e.g., the "S" indicator for the 50, 75, 200, 300, 650, 1000, 1300, 1900, 1950, 2250, 3500, 5000, and 9000 kbps representations), and a third subset of representations with playback mode information indicating that a corresponding playback bitrate is associated with both the streaming playback and download playback modes (e.g., the "S, D" indicator for the 120 and 450 kbps representations).

It should be appreciated that master manifest data 119a is for an enhanced media content asset (e.g., the popular movie), since master manifest data 119a includes representations (e.g., the 1800 and 2800 kbps representations) that are indicated as being specific for download playback mode (also referred to as "off-line playback mode").

In contrast, master manifest data 119b is for a legacy media content asset (e.g., the obscure movie), since master manifest data 119b does not include representations indicated as being specific for download playback mode. Specifically, master manifest data 119b includes a first subset of representations with playback mode information indicating that a corresponding playback bitrate is associated with only the streaming playback mode (e.g., the "S" indicator for the 50, 75, 200, 300, 650, 1000, 1300, 1900, 1950, 2250, 3500, 5000, and 9000 kbps representations), and a second subset of representations with playback mode information indicating that a corresponding playback bitrate is associated with both the streaming playback and download playback modes (e.g., the "S, D" indicator for the 120, 450, 1950, and 5000 kbps representations).

As an example, in anticipation of the high likelihood that a customer will request the popular movie for download playback, the media content service has allocated encoding computation time on an encoding server (not depicted in FIG. 1) to generate two additional encodings that are specifically for download playback, the 1800 and 2800 kbps representations. In certain implementations, manifest service 130 (e.g., in response to a hash indicating viewer device capabilities and permissions) generates master manifest data 119a that includes the 1800 and 2800 kbps representations, and furthermore, includes playback mode information indicating association with one or more playback modes for each playback bitrate (e.g., "S," "D," or "S, D").

In some implementations, the representations that are specific for download playback provide smaller file sizes (thereby reducing download time) without compromising quality. For example, for the obscure movie, manifest service 130 generates master manifest data 119b that includes two representations, 1950 and 5000 kbps, that have playback mode information indicating association with both streaming and download playback. In particular scenarios, such as the popular movie and the obscure movie having similar characteristics (e.g., duration, image complexity, noise levels, motion, natural versus synthetic imagery, etc.), the 1800 kbps representation in master manifest data 119a can provide a smaller file size but similar or better quality compared to the 1950 kbps representation in the master manifest data 119b, and the 2800 kbps representation in master manifest data 119a can also provide a smaller file size but similar or better quality relative to the 5000 kbps representation in the master manifest data 119b. As another example, a 1080p Full-HD video at 2.2 mbps encoded for download playback can be about 70% smaller in file size than existing 1080p streaming playback encodings.

Master manifest data 119a and 119b are not provided to viewer devices 105a and 105b, respectively. As one example, the probability that a viewer device can obtain an unauthorized complete copy of media content by spoofing requests for fragments of a representation dedicated for download playback can be reduced by limiting access to the contents of master manifest data. As another example, certain algorithms for selecting a representation or filtering available representations in the manifest data can be executed on the server-side, rather than the algorithms being provided to viewer devices for execution. As yet another example, the playback mode information in master manifest data 119a and 119b may be incompatible with viewer devices implementing certain industry standards (e.g., HLS, MPEG-DASH, etc.), or other systems (e.g., secondary content insertion, etc.).

As yet a further example, using existing deployed control logic for selecting a representation for playback from the master manifest data may result in an incorrect choice. For example, control logic for selecting a representation for playback can include quality to bitrate mapping logic, and playback bitrate selection logic.

FIG. 7A and FIG. 7B illustrate examples of quality to bitrate mappings implemented as lookup tables that take as inputs four different quality levels (e.g., Data Saver, Good, Better, and Best), two different codecs (e.g., AVC, HEVC), and three different resolutions (e.g., UHD, HD, and SD). Based on a requested quality, different quality to bitrate mappings can be used to obtain a particular playback bitrate constraint, including but not limited to a maximum bitrate. For example, for an input of Better quality, HEVC, and HD resolution, the quality to bitrate mapping in FIG. 7A outputs a maximum bitrate constraint of 1950 kbps, and the quality to bitrate mapping in FIG. 7B outputs a maximum bitrate constraint of 1800 kbps.

FIG. 7C illustrates an example of a playback bitrate selection algorithm that takes as an input a maximum bitrate and resolution (e.g., maximum height and maximum width), and selects a particular playback bitrate corresponding to the representation having the closest playback bitrate to the maximum bitrate that also has an image height and image width smaller than or equal to the maximum height and maximum width. In certain implementations, the playback bitrate selection algorithm illustrated in FIG. 7C can take as inputs the output of the quality to bitrate mapping illustrated in FIG. 7A, or the output of the quality to bitrate mapping illustrated in FIG. 7B, or other logic.

In an example scenario, the quality to bitrate mapping illustrated in FIG. 7B is being used for quality and playback bitrate mapping logic 140a at viewer device 105a, and the playback bitrate selection algorithm illustrated in FIG. 7C is being used for playback bitrate selection logic 145a at viewer device 105a. In a scenario where viewer device 105a also receives master manifest data 119a (or a version of master manifest data 119a with playback mode information removed for compatibility purposes) in response to a request for download playback of the popular movie, if viewer device 105a provides to control logic 139a an input of Better quality, HD resolution, and the HEVC codec (as represented by settings 115a having Quality X1, Resolution Y1, and Codec Z1) the quality to bitrate mapping in FIG. 7B outputs a maximum bitrate constraint of 1800 kbps, and the playback bitrate selection algorithm illustrated in FIG. 7C would select the 1800 kbps representation from master manifest data 119a (as represented by the output of "X kbps" from control logic 139a), which is suited for download playback (as indicated by the "D" in the row for 1800 kbps).

However, if the quality to bitrate mapping illustrated in FIG. 7A is being used instead, for the same input of Better quality, HEVC, and HD resolution, the quality to bitrate mapping in FIG. 7A outputs a maximum bitrate constraint of 1950 kbps, and the playback bitrate selection algorithm illustrated in FIG. 7C would select the 1950 kbps representation from master manifest data 119a, which is suited for streaming playback but is not targeted for download playback (as indicated by the "S" in the row for 1950 kbps). These two contrasting scenarios demonstrate one instance of how a representation not suited for download playback is provided in response to a request for download playback of enhanced media content asset when master manifest data is being used by the viewer device.

By way of comparison, in another scenario, the quality to bitrate mapping illustrated in FIG. 7A is being used for quality and playback bitrate mapping logic 140b at viewer device 105b, and the playback bitrate selection algorithm illustrated in FIG. 7C is being used for playback bitrate selection logic 145b at viewer device 105b. In a scenario where viewer device 105b also receives master manifest data 119b in response to a request for download playback of the obscure movie, if viewer device 105b provides to control logic 139b an input of Better quality, HEVC, and HD resolution (again as represented by settings 115a) the quality to bitrate mapping in FIG. 7A outputs a maximum bitrate constraint of 1950 kbps, and the playback bitrate selection algorithm illustrated in FIG. 7C would select the 1950 kbps representation from master manifest data 119b (as represented by the output of "Y kbps" from control logic 139b), which is suited for download playback (as indicated by the "S, D" in the row for 1950 kbps).

However, if the quality to bitrate mapping illustrated in FIG. 7B is being used instead, for the same input of Better quality, HEVC, and HD resolution, the quality to bitrate mapping in FIG. 7B outputs a maximum bitrate constraint of 1800 kbps, and the playback bitrate selection algorithm illustrated in FIG. 7C would select the 1900 kbps representation from master manifest data 119b (by virtue of being the closest available bitrate to the maximum bitrate of 1800 kbps), which is suited for streaming playback but is not targeted for download playback (as indicated by the "S" in the row for 1900 kbps). Again, these two contrasting scenarios demonstrate one instance of how a representation not suited for download playback is provided in response to a request for download playback of a legacy media content asset when master manifest data is being used by the viewer device.

Rather than providing the master manifest data to the viewer devices, the media server can provide a subset of the available representations in a respective filtered manifest data provided to a viewer device to increase (relative to using master manifest data) the precision of selections made by logic on viewer devices 105a and 105b, such as control logic 139a and 139b, respectively. For example, manifest service 130 can generate filtered manifest data 120a and 120b for viewer devices 105a and 105b, respectively, by considering the request, or also considering characteristics of the viewer device, playback history, and other factors provided by the viewer device (e.g., as represented by viewer device information 121). As a result, viewer devices may receive different filtered manifest data indicating different representations to be selected from. Other types of data, such as available subtitles, audio quality or bitrates, etc. can also differ between the filtered manifest data.

In more detail, when viewer devices 105a and 105b request download playback of media content, the requests can be provided to media server 125 to provide manifest data indicating fragments, or segments, of the playback of the media content available at different bitrates. The manifest data includes metadata that allows the viewer device to generate properly formatted requests for specific fragments of the media content. A sequence of fragments together provides playback of the full media content. Audio portions of the media content can also be provided in fragments. Additional information, such as available subtitles, can also be provided in the manifest data.

Media server 125 can be an edge server of a content delivery network (CDN) which can have a cache for providing fragments of the media content for playback (e.g., either streaming playback or download playback) on viewer devices 105a and 105b, receive fragments from other components of the CDN (e.g., origin servers), and cache filtered manifest data that can be generated in response to a request for download playback or pre-generated before such a request is received.

In FIG. 1, media server 125 can communicate with manifest service 130, which can be an application server that can be part of or external to the CDN. In some implementations, the functionality of media server 125, manifest service 130, and/or manifest configuration service 135 can be implemented within the same server, within the same CDN, or across several servers. Media server 125 can provide information regarding viewer devices 105a and 105b making the requests for the manifest data to manifest service 130 that can be used to generate filtered manifest data 120a and 120b.

As an example, the filtered manifest data 120a depicted in FIG. 1 includes the four representations in master manifest data 119a that have corresponding playback mode information indicating association with download playback. For example, filtered manifest data 120a includes the playback bitrates of 120, 450, 1800, and 2800 kbps, which correspond to the playback bitrates in master manifest data 119a that have playback mode information of "S, D", "S, D", "D", and "D" respectively, indicating that the particular bitrate is associated with download playback (the first two playback bitrates are also associated with streaming playback). As depicted in FIG. 1, filtered manifest data 120a does not include playback information for the playback bitrates of 120, 450, 1800, and 2800 kbps (e.g., "S, D", "S, D", "D", and "D" respectively).

Similar to the example scenario discussed earlier, the quality to bitrate mapping illustrated in FIG. 7B is being used for quality and playback bitrate mapping logic 140a at viewer device 105a, and the playback bitrate selection algorithm illustrated in FIG. 7C is being used for playback bitrate selection logic 145a at viewer device 105a. In a scenario where viewer device 105a also receives filtered manifest data 120a in response to a request for download playback of the popular movie, if viewer device 105a provides to control logic 139a an input of Better quality, HD resolution, and the HEVC codec, the quality to bitrate mapping in FIG. 7B outputs a maximum bitrate constraint of 1800 kbps, and the playback bitrate selection algorithm illustrated in FIG. 7C would select the 1800 kbps representation from filtered manifest data 120a, which is suited for download playback (as indicated by the "D" in the row for 1800 kbps in the master manifest data 119a).

If the quality to bitrate mapping illustrated in FIG. 7A is being used instead by viewer device 105a, for the same input of Better quality, HEVC, and HD resolution, the quality to bitrate mapping in FIG. 7A outputs a maximum bitrate constraint of 1950 kbps, and the playback bitrate selection algorithm illustrated in FIG. 7C would again select the 1800 kbps representation from filtered manifest data 120a (by virtue of being the closest playback bitrate within resolution constraints to the maximum bitrate constraint of 1950 kbps). As mentioned above, the 1800 kbps representation is suited for download playback.

These two scenarios represent how regardless of variations in control logic 139a, a representation suited for download playback is provided in response to a request for download playback of an enhanced media content asset when filtered manifest data 120a is provided to control logic 139a.

By way of comparison, the quality to bitrate mapping illustrated in FIG. 7A is being used for quality and playback bitrate mapping logic 140b at viewer device 105b, and the playback bitrate selection algorithm illustrated in FIG. 7C is being used for playback bitrate selection logic 145b at viewer device 105b. In a scenario where viewer device 105b receives filtered manifest data 120b in response to a request for download playback of the obscure movie, if viewer device 105b provides to control logic 139b an input of Better quality, HEVC, and HD resolution the quality to bitrate mapping in FIG. 7A outputs a maximum bitrate constraint of 1950 kbps, and the playback bitrate selection algorithm illustrated in FIG. 7C would select the 1950 kbps representation in filtered manifest data 120b, which is suited for download playback (as indicated by the "S, D" in the row for 1950 kbps in master manifest data 119b).

If the quality to bitrate mapping illustrated in FIG. 7B is being used instead, for the same input of Better quality, HEVC, and HD resolution, the quality to bitrate mapping in FIG. 7B outputs a maximum bitrate constraint of 1800 kbps, and the playback bitrate selection algorithm illustrated in FIG. 7C would select the 1950 kbps representation from filtered manifest data 120b (by virtue of being the closest playback bitrate within resolution constraints to the maximum bitrate constraint of 1800 kbps), which is suited for streaming playback (as indicated by the "S, D" in the row for 1950 kbps in master manifest data 119b).

These two scenarios represent how regardless of variations in control logic 139b, a representation suited for download playback is provided in response to a request for download playback of a legacy media content asset when filtered manifest data 120b is provided to control logic 139b.

It should be appreciated that viewer device-side (client-side) control logic for selecting a representation in received manifest data is not limited to the examples provided in FIGS. 7A-7C.

Techniques enabled by the present disclosure can allow precise selection of targeted video bitrate and help avoid instances where a representation not suited for download playback in response to a request for download playback, regardless of the permutation of characteristics of the media content being requested (e.g., an enhanced media content asset which may have associated manifest data such as master manifest data 119a or a legacy media content which may have associated manifest data such as master manifest data 119b) and characteristics of the viewer device requesting media content (e.g., an enhanced viewer device with the quality to bitrate mapping illustrated in FIG. 7B or a legacy viewer device with the quality to bitrate mapping illustrated in FIG. 7A). Furthermore, techniques enabled by the present disclosure can overcome lack of granularity imposed by certain Application Program Interfaces (APIs) for playback bitrate selection, including but not limited to APIs that provide "fuzzy" playback bitrate selection.

It should be appreciated that certain implementations of the techniques enabled by the present disclosure allow support for improving the experience of certain customers for download playback by reducing download times, while still supporting a longtail for media content assets (e.g., media content that has not yet been backfilled with encodings targeted for download playback), and still supporting a longtail for viewer devices (e.g., viewer devices that have not been updated with the quality to bitrate mapping illustrated in FIG. 7B, or other updates to logic). It should further be appreciated that the techniques enabled by the present disclosure support both longtail scenarios, along with improved download playback with reduced download times, without requiring modification of logic (e.g., playback bitrate selection logic 145a and playback bitrate selection logic 145b can use the same version of a playback bitrate selection algorithm, such as the example in FIG. 7C, or the same version of other algorithms). It should also be appreciated that the techniques enabled by the present disclosure are compatible with other viewer-device side logic, including not limited to adaptive bitrate (ABR) video streaming heuristics.

Figure 2:
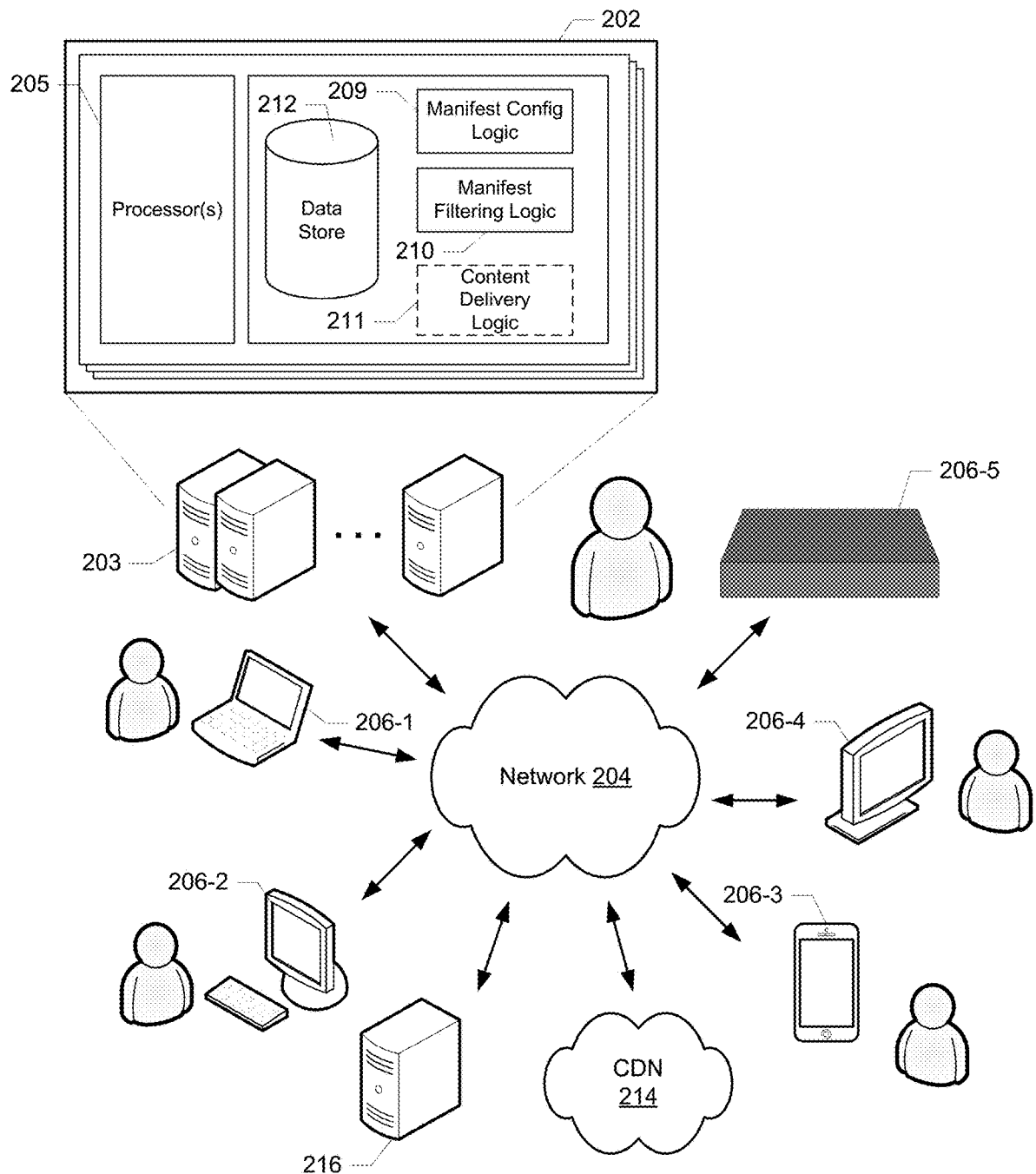
FIG. 2 illustrates an example of a computing environment for supporting multiple playback modes for media content.

FIG. 2 illustrates an example of a computing environment in which video streams may be transmitted for streaming playback or download playback via network 204 to a variety of viewer devices (206-1 through 206-5) implementing the techniques described herein. Service 202 may conform to any of a wide variety of architectures such as, for example, a services platform deployed at one or more co-locations, each implemented with one or more servers 203 having one or more processors 205 (e.g., central processing units (CPUs), graphic processing units (GPUs), tensor processing units (TPUs), etc.). Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Viewer devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to manifest configuration logic 209 for generating or obtaining master manifest data for media content, and manifest filtering logic 210 to process master manifest data and output filtered manifest data compatible with a viewer device, service 202 may include other types of logic, such as content delivery logic 211, along with other logic (not shown) involved in delivery of media content for streaming playback or download playback (e.g., control plane logic, data plane logic, Digital Rights Management, secondary content insertion, device proxies, URL vending services, video back ends, transformation scripts, etc.) of media content.

In addition to information for managing manifest data for different playback modes (including but not limited to streaming or download playback), service 202 may also include a variety of information related to the video content (e.g., other associated metadata and manifests in data store 212 which service 202 uses, or to which service 202 provides access or transmits to viewer devices 206). For example, data store 212 may also include data representing encoder configurations suitable for streaming or download playback modes, viewer device capabilities (e.g., legacy and enhanced viewer devices, also referred to as updated viewer devices), schedules for backfilling legacy media content assets, one or more versions of playback bitrate selection logic, one or more versions of quality to playback bitrate mapping logic, etc. In some cases, any of the information in data store 212 may be provided and/or hosted by one or more separate platforms, e.g., CDN 214 or other third-party platform 216. It should be noted that, while logic 209, 210, and 211, and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
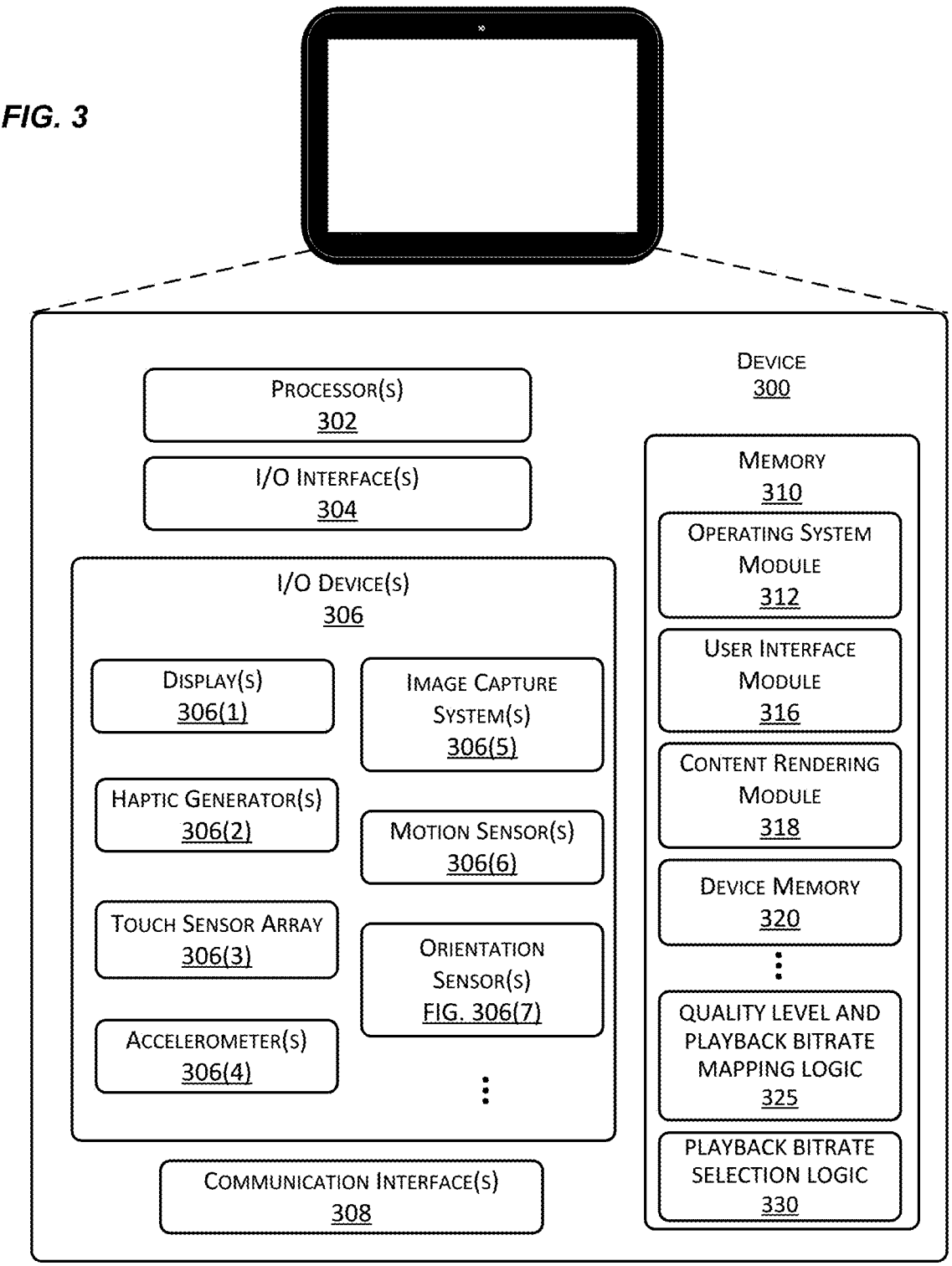
FIG. 3 is a simplified block diagram of a viewer device in which various implementations of supporting multiple playback modes for media content may be practiced.

A block diagram of an example of a viewer device 300 suitable for use with various implementations is shown in FIG. 3. Viewer device 300 may include a wide variety of device types. In FIG. 3, viewer device 300 is depicted as a tablet device and includes one or more single or multi-core processors 302 configured to execute stored instructions (e.g., in device memory 320). Viewer device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with viewer device 300.

Viewer device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Viewer device 300 also includes one or more buses or other internal communications hardware or software (not shown) that allow for the transfer of data and instructions between the various modules and components of the device.

Viewer device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of viewer device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

It will be understood that viewer device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

In certain implementations, viewer device 300 can include control logic for selecting a representation from manifest data received at the viewer device. For example, the control logic can include quality level and playback bitrate mapping logic 325. Quality level and playback bitrate mapping logic 325 can receive as inputs one or more parameters (e.g., quality level, resolution, codec, etc.) and output one or more constraints (e.g., maximum bitrate) that can be used for selecting a particular representation in manifest data. In various implementations, viewer device 300 may transmit the one or more parameters to media server 125 and receive in response the one or more constraints. In some implementations, viewer device 300 generates the one or more constraints without using quality level and playback bitrate mapping logic 325 (e.g., generating a bitrate constraint based on monitoring network conditions, etc.). In certain implementations, the one or more algorithms in quality level and playback bitrate mapping logic 325 can be updated.

In particular implementations, the control logic for selecting a representation from manifest data includes playback bitrate selection logic 330. Playback bitrate selection logic 330 selects a representation from the available representations in the manifest data received at viewer device 300. For example, playback bitrate selection logic 330 can identify the specific URL or associated metadata for generating a URL for obtaining a fragment of media content corresponding to the selected representation. Playback bitrate selection logic 330 can employ different algorithms for different playback modes, or the same algorithm for different playback modes. In certain implementations, the one or more algorithms in playback bitrate selection logic 330 can be updated.

Figure 4:
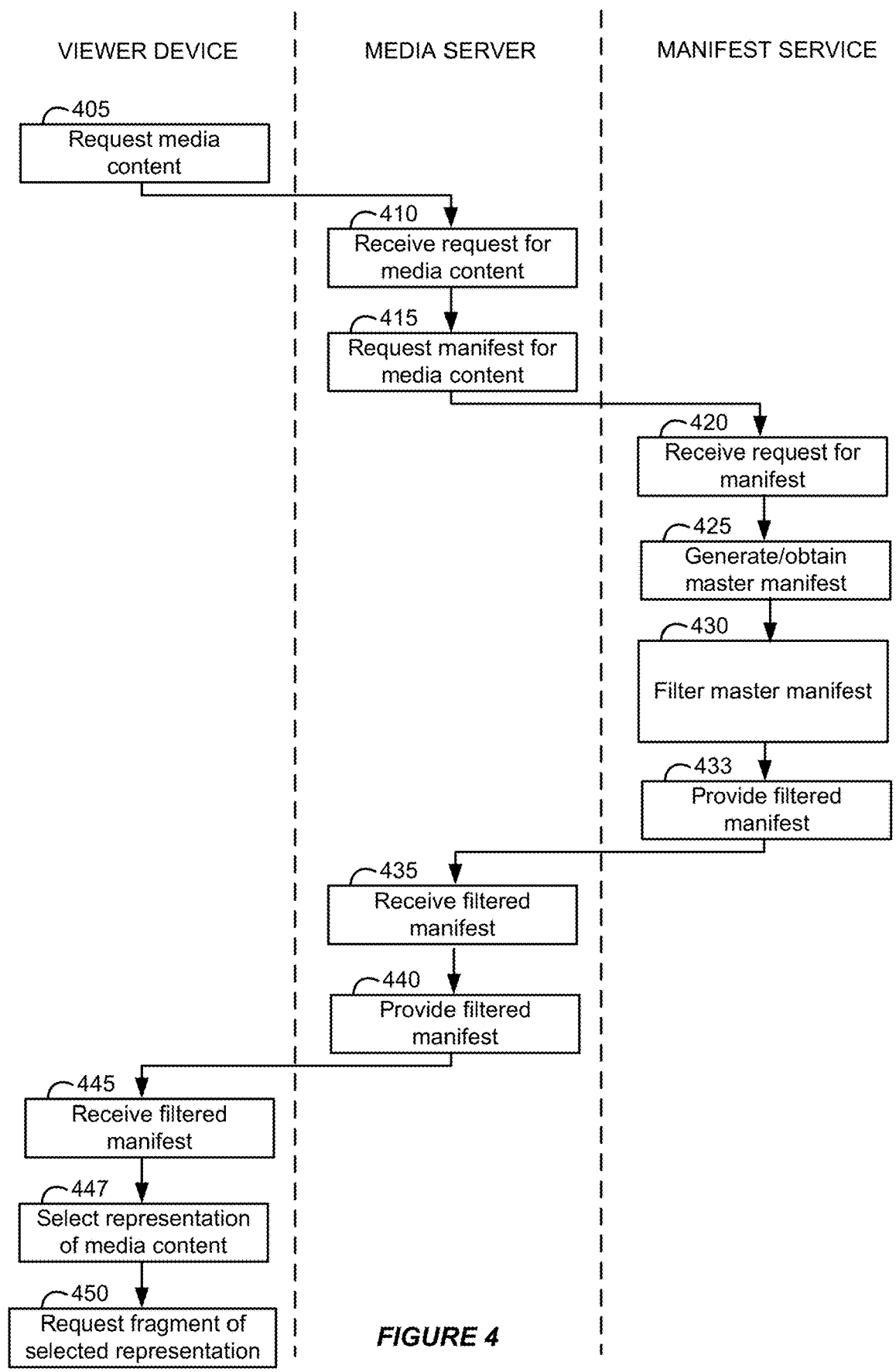
FIG. 4 is a flowchart illustrating a process for supporting multiple playback modes for media content.

A specific implementation will now be described with reference to FIG. 1, the computing environment of FIG. 2, the viewer device of FIG. 3, and the flow diagram of FIG. 4. In FIG. 4, a viewer device can request media content, for example, by selecting a movie, an episode of a television show, a class lecture, etc., for download playback from a media content service in a web browser or software program, and therefore, request media content from media server 125 (405). The request can be provided to and received by media server 125 (410). Media server 125 can then request a manifest data for the specific media content from manifest service 130 (415). For example, media server 125 can provide an identifier of the specific media content (e.g., title, catalog number, episode number, etc.) to manifest configuration service 135 (directly or through manifest service 130). In certain implementations, manifest configuration service 135 and manifest service 130 are implemented on the same server. Additionally, media server 125 can provide viewer device information 121 regarding the request received from the viewer device, such as an IP address of the viewer device or information regarding the viewer device (e.g., the type of device, capabilities of the device, subscription service, etc.) to manifest configuration service 135. In some implementations, the request and/or the viewer device information are represented by a hash and provided to manifest configuration service 135. As a result, manifest configuration service 135 can receive the request (420), as well as additional data regarding the request and data regarding the viewer device that initiated the request, to generate or obtain master manifest data for the media content.

Manifest service 130 can generate or obtain master manifest data (e.g., master manifest data 119*a* or 119*b*) using the data provided by media server 125 and data in data store 212 (e.g., local storage or cloud storage) (425). In various implementations, an element can be added to obtained manifest data or an element can be included when generating manifest data, where the element represents playback mode information (e.g., support for download playback, streaming playback, and/or other types of playback). FIG. 6A is an example of manifest data that includes playback mode information. For instance, the representation with bandwidth="120000" is associated with playback mode information 605 indicated by the XML tag syntax <PlaybackMode> . . . </PlaybackMode> that includes the tag elements <SupportedMode>Download</SupportedMode> and <SupportedMode>Streaming</SupportedMode>, signaling that the representation with bandwidth="120000" is associated with both the streaming playback mode and download playback mode. The representation with bandwidth="1800000" is associated with playback mode information 610 signaling that the representation is associated with only the download playback mode. The representation with bandwidth="1950000" is associated with playback mode information 615 signaling that the representation is associated with only the streaming playback mode.

It should be appreciated that the use of XML in FIG. 6A is an example, and a wide variety of notations and formats can be used for playback mode information. It should also be appreciated that the association between playback mode information and a particular playback bitrate can use different groupings. For example, each playback bitrate can have separate playback information (e.g., playback mode information for each representation), or a group of playback bitrates can share a single parameter representing playback mode information for all the playback bitrates in the group (e.g., a playback mode information setting applicable to an Adaptation set), and so forth.

In certain implementations, different combinations of data provided by media server 125 related to the request and the additional data stored by or accessible by manifest service 130 or manifest configuration service 135 can be used to generate or obtain different master manifest data, for example, for different viewer devices with different subscription levels (e.g., premium subscriptions with support for UHD) or different capabilities (e.g., a device without support for UHD). Manifest service 130 (or manifest configuration service 135) can filter (or generate the information identifying filters to apply) the master manifest data (430).

Figure 5:
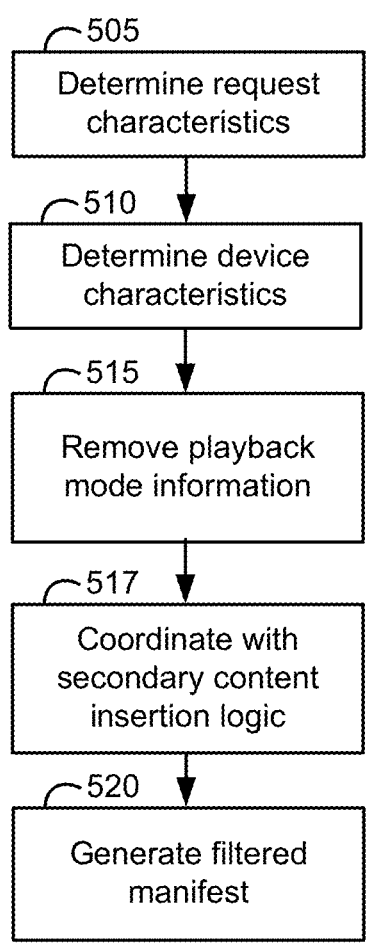
FIG. 5 is a flowchart illustrating a process for filtering manifest data.

FIG. 5 is a flowchart illustrating generating filtered manifest data from master manifest data. In FIG. 5, characteristics of the request made by viewer device 105*a* to stream media content can be determined and used to generate filtered manifest data 120*a* or 120*b* (505). For example, the type of playback mode indicated by the request or metadata associated with the request may be used by manifest filtering logic 210 of manifest service 130 to select a subset of master manifest data 119*a* related to the media content being requested by viewer device 105*a*. As one example, a request for a first mode ("Mode 1") of playback results in filtering out playback bitrates that are associated with playback mode information indicating support for only a second mode ("Mode 2") of playback. As another example, a request for Mode 2 of playback results in filtering out playback bitrates that are associated with playback mode information indicating support for only Mode 1. In certain implementations, for a request for Mode 1, playback bitrates that are associated with playback mode information indicating support for at least Mode 1 (e.g., support for only Mode 1, support for Mode 1 and Mode 2), are included in filtered manifest data. In various implementations, if no requested playback mode is indicated, or is an unknown mode that does not match any modes indicated as supported, a playback bitrate is kept for the filtered manifest data. An example of logic for manifest filtering logic 210 is shown in Table 1 below.

TABLE 1

| Requested playback mode | Playback mode information for manifest playback bitrate: Mode 1 | Playback mode information for manifest playback bitrate: Mode 2 | Playback mode information for manifest playback bitrate: Mode 1 and Mode 2 |
| --- | --- | --- | --- |
| Mode 1 | Keep playback bitrate | Remove playback bitrate | Keep playback bitrate |
| Mode 2 | Remove playback bitrate | Keep playback bitrate | Keep playback bitrate |
| Unknown mode | Keep playback bitrate | Keep playback bitrate | Keep playback bitrate |

It should be appreciated that other implementations of logic for manifest filtering logic 210 can be used (e.g., if requested playback mode is unavailable or unknown, remove rather than keep a playback bitrate, or abort filtering process, etc.). In a class of implementations, a portion of the playback bitrates in master manifest data may not have associated playback mode information, and manifest filtering logic 210 can include such playback bitrates, exclude such playback bitrates, or abort the filtering process.

Characteristics of a viewer device can also be considered when determining the representation to include in filtered manifest data (510). For example, media server 125 can provide a device identification to manifest service 130, or media server 125 can provide another type of identifier (e.g., one related to the account being used by viewer device 105*a*) that can be correlated with the type of viewer device that is requesting to play back the media content. Some viewer devices might use an operating system or software program that uses a "fuzzy" algorithm to select and request the fragments detailed in manifest data for playback, as previously discussed. As a result, filtered manifest data being generated for the viewer device identified as using the fuzzy algorithm can exclude or include certain representations such that when the filtered manifest data is delivered to the viewer device, the viewer device selects a representation in a more predictable or consistent manner relative to unfiltered manifest data. In certain implementations, the data regarding types of devices and the representations that might be included or excluded can be detailed within data store 212.

In certain implementations, manifest filtering logic 210 removes the playback mode information (515). For example, manifest filtering logic 210 can remove the strikethrough portion indicated in the XML markup below. By removing playback mode information, compatibility with certain industry standards can be provided (e.g., MPEG-DASH). FIG. 6B illustrates an example of part of filtered manifest data, where playback mode information is not present for the representations associated with bandwidth="1800000" and bandwidth="1200000". It should be appreciated that the syntax of <PlaybackMode>, <SupportedMode>, Download, and Streaming are examples, and a wide variety of notations (Boolean flags, enumerated list, etc.), syntaxes, markup (including but not limited to XML, HTML, etc.) or non-markup (including but not limited to text, m3u format, m3u8 format, etc.) based schemas can be used for playback mode information.

XML markup:
<Representation width="1280" scanType="progressive" sar="1:1" id="video=1800000" height="720" frameRate="25000/1001" codecs="hev1.1.6.L93.90" bandwidth="1800000">
<BaseURL>guid_video_10.mp4</BaseURL>
<SegmentList duration="101178" timescale="25000">
<Initialization range="0-1665"/>
<SegmentURL mediaRange="9150-140228"/>
. . . .
</SegmentList>
</Representation>

In particular implementations, manifest filtering logic 210 also includes logic for coordinating with secondary content insertion processes (517). For example, manifest filtering logic 210 can provide an indication to validation logic to ignore certain flags that would otherwise prevent assigning a valid interstitial identifier for secondary content insertion. In certain implementations, in response to detecting the presence of playback mode information supporting download playback, and in response to a request for download playback, secondary content insertion processes can be bypassed (e.g., advertisements are not inserted into main content).

Filtered manifest data can be generated (520) by manifest service 130, such as, for example, in real time in response to a request for particular media content, or pre-generated before a request for particular media content is generated by a viewer device, and provided to media server 125 (433). In certain implementations, manifest configuration service 135 provides information relating to filtering to manifest service 130. For example, manifest configuration service 135 can provide a hash of a filter to be applied.

Though the above examples describe generating manifest data by including, or excluding, certain video bitrates, additional data can be included or excluded in the filtered manifest data (e.g., audio quality levels, subtitles, etc.).

Referring back to the flow diagram of FIG. 4, media server 125 can then receive the filtered manifest data from manifest service 130 (435) and provide the filtered manifest data to the viewer device (440). The viewer device can receive the filtered manifest data (445) and select a particular representation out of the representations available in the filtered manifest data (447), and begin requesting fragments for the selected representation (450). In certain implementations selecting, the particular representation includes using algorithm such as, for example, control logic 139a at viewer device 105a or control logic 139b at viewer device 105b. For example, control logic 139a can include quality and playback bitrate mapping logic (e.g., including but not limited to the examples in FIG. 7A, FIG. 7B) and playback bitrate selection logic 145a (e.g., including but not limited to the example in FIG. 7C) for selecting the particular representation, as described in detail earlier in reference to FIG. 1. As a result, the request for the fragment can be received by media server 125, media server 125 can retrieve and provide the requested fragment, and the viewer device can receive the fragment and store the fragment for playback.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, including:
receiving, from a first viewer device, a first identifier of first media content;
receiving, from a second viewer device, a second identifier of second media content;
accessing, based on the first identifier, first master manifest data for the first media content, the first master manifest data including a first plurality of representations, each of the first plurality of representations having bitrate information associated therewith, each of the associated bitrate information being a different value, each of the first plurality of representations further having playback mode information associated therewith, the first plurality of representations including:
a first subset of representations for which the associated playback mode information indicates support for only a download playback mode;
a second subset of representations for which the associated playback mode information indicates support for only a streaming playback mode; and
a third subset of representations for which the associated playback mode information indicates support for both the download playback mode and the streaming playback mode;
accessing, based on the second identifier, second master manifest data for the second media content, the first media content and the second media content being different, the second master manifest data including a second plurality of representations, each of the second plurality of representations having bitrate information associated therewith, each of the associated bitrate information being a different value, each of the second plurality of representations further having playback mode information associated therewith, the second plurality of representations including:
  a fourth subset of representations for which the associated playback mode information indicates support for only the streaming playback mode; and
  a fifth subset of representations for which the associated playback mode information indicates support for both the download playback mode and the streaming playback mode;
  wherein the second master manifest data does not include any representations for which only the download playback mode is indicated as being supported;
configuring the first master manifest data to generate first filtered manifest data compatible with a version of viewer device-side representation selection logic by:
  excluding the second subset of representations;
  including the first subset of representations; and
  including the third subset of representations;
  wherein the first filtered manifest data does not include any of the playback mode information for the first plurality of representations and includes the bitrate information for the first plurality of representations;
transmitting the first filtered manifest data to the first viewer device;
configuring the second master manifest data to generate second filtered manifest data compatible with the version of viewer device-side representation selection logic by:
  excluding the fourth subset of representations; and
  including the fifth subset of representations; and
  wherein the second filtered manifest data does not include any of the playback mode information for the second plurality of representations and includes the bitrate information for the second plurality of representations; and
transmitting the second filtered manifest data to the second viewer device;
receiving, from the first viewer device, a first selection of a representation from the first filtered manifest data; and
receiving, from the second viewer device, a second selection of a representation from the second filtered manifest data.

2. The method of claim 1, wherein for the streaming playback mode, playback of requested media content can be initiated by a viewer device before completing downloading of the requested media content, and for the download playback mode, playback of requested media content can be initiated by a viewer device after completing downloading of the requested media content.

3. The method of claim 1, wherein the playback mode information is represented in the first master manifest data and the second master manifest data by one or more elements delimited by a tag in a markup language, or the playback mode information is represented in the first master manifest data and the second master manifest data by one or more Boolean elements.

4. The method of claim 1,
  further wherein the first filtered manifest data and the second filtered manifest data are compatible with a first mapping on the viewer-device side between an input quality, an input resolution, and an input codec to an output maximum bitrate constraint, and the first filtered manifest data and the second filtered manifest data are also compatible with a second mapping on the viewer-device side between an input quality, an input resolution, and an input codec to an output maximum bitrate constraint, wherein the first mapping and the second mapping output different maximum bitrate constraints for the same input quality, input resolution, and input codec.

5. A computer-implemented method, including:
accessing first master manifest data for first media content, the first master manifest data including a first plurality of playback bitrates, each of which has playback mode information associated therewith, the first plurality of playback bitrates including:
  a first subset of playback bitrates for which the associated playback mode information indicates support for only a download playback mode;
  a second subset of playback bitrates for which the associated playback mode information indicates support for only a streaming playback mode; and
  a third subset of playback bitrates for which the associated playback mode information indicates support for both the download playback mode and the streaming playback mode;
accessing second master manifest data for second media content, the first media content and the second media content being different, the second master manifest data including a second plurality of playback bitrates, each of which has playback mode information associated therewith, the second plurality of playback bitrates including:
  a fourth subset of playback bitrates for which the associated playback mode information indicates support for only the streaming playback mode; and
  a fifth subset of playback bitrates for which the associated playback mode information indicates support for both the download playback mode and the streaming playback mode;
  wherein the second master manifest data does not include any playback bitrates for which only the download playback mode is indicated as being supported;
configuring the first master manifest data to generate first filtered manifest data compatible with a version of viewer device-side playback bitrate selection logic by:
  excluding the second subset of playback bitrates;
  including the first subset of playback bitrates; and
  including the third subset of playback bitrates;
  wherein the first filtered manifest data does not include any of the playback mode information for the first plurality of playback bitrates; and
configuring the second master manifest data to generate second filtered manifest data compatible with the version of viewer device-side playback bitrate selection logic by:
  excluding the fourth subset of playback bitrates; and
  including the fifth subset of playback bitrates; and
  wherein the second filtered manifest data does not include any of the playback mode information for the second plurality of playback bitrates.

6. The method of claim 5, wherein for the streaming playback mode, playback of requested media content can be initiated by a viewer device before completing downloading of the requested media content, and for the download playback mode, playback of requested media content can be initiated by a viewer device after completing downloading of the requested media content.

7. The method of claim 5, wherein the version of viewer device-side playback bitrate selection logic is compatible with both streaming playback requests and download playback requests.

8. The method of claim 5, wherein the version of viewer device-side playback bitrate selection logic includes logic for selecting a playback bitrate from a plurality of available playback bitrates in manifest data received by a viewer device based on the selected playback bitrate being closest to a maximum bitrate constraint.

9. The method of claim 8, wherein the maximum bitrate constraint provided as an input to the version of viewer device-side playback bitrate selection logic is an output of a lookup table having inputs including a quality level constraint and one or more image resolution constraints, and further wherein the first filtered manifest data and the second filtered manifest data are compatible with different versions of the lookup table.

10. The method of claim 5, wherein the playback mode information is represented in the first master manifest data and the second master manifest data by one or more elements delimited by a tag in a markup language, or the playback mode information is represented in the first master manifest data and the second master manifest data by one or more Boolean elements.

11. The method of claim 5, wherein the first master manifest data or the second master manifest data includes a playback bitrate with no associated playback mode information.

12. The method of claim 5, wherein validation logic for insertion of secondary content into the first media content or second media content is bypassed in response to determining that a requested playback mode is the download playback mode.

13. A system comprising one or more processors and one or more non-transitory storage media operatively coupled to the one or more processors, the one or more processors being configured for:
accessing first master manifest data for first media content, the first master manifest data including a first plurality of playback bitrates, each of which has playback mode information associated therewith, the first plurality of playback bitrates including:
a first subset of playback bitrates for which the associated playback mode information indicates support for only a download playback mode;
a second subset of playback bitrates for which the associated playback mode information indicates support for only a streaming playback mode; and
a third subset of playback bitrates for which the associated playback mode information indicates support for both the download playback mode and the streaming playback mode;
accessing second master manifest data for second media content, the first media content and the second media content being different, the second master manifest data including a second plurality of playback bitrates, each of which has playback mode information associated therewith, the second plurality of playback bitrates including:
a fourth subset of playback bitrates for which the associated playback mode information indicates support for only the streaming playback mode; and
a fifth subset of playback bitrates for which the associated playback mode information indicates support for both the download playback mode and the streaming playback mode;
wherein the second master manifest data does not include any playback bitrates for which only the download playback mode is indicated as being supported;
configuring the first master manifest data to generate first filtered manifest data compatible with a version of viewer device-side playback bitrate selection logic by:
excluding the second subset of playback bitrates;
including the first subset of playback bitrates; and
including the third subset of playback bitrates;
wherein the first filtered manifest data does not include any of the playback mode information for the first plurality of playback bitrates; and
configuring the second master manifest data to generate second filtered manifest data compatible with the version of viewer device-side playback bitrate selection logic by:
excluding the fourth subset of playback bitrates; and
including the fifth subset of playback bitrates; and
wherein the second filtered manifest data does not include any of the playback mode information for the second plurality of playback bitrates.

14. The system of claim 13, wherein for the streaming playback mode, playback of requested media content can be initiated by a viewer device before completing downloading of the requested media content, and for the download playback mode, playback of requested media content can be initiated by a viewer device after completing downloading of the requested media content.

15. The system of claim 13, wherein the version of viewer device-side playback bitrate selection logic is compatible with both streaming playback requests and download playback requests.

16. The system of claim 13, wherein the version of viewer device-side playback bitrate selection logic includes logic for selecting a playback bitrate from a plurality of available playback bitrates in manifest data received by a viewer device based on the selected playback bitrate being closest to a maximum bitrate constraint.

17. The system of claim 16, wherein the maximum bitrate constraint provided as an input to the version of viewer device-side playback bitrate selection logic is an output of a lookup table having inputs including a quality level constraint and one or more image resolution constraints, and further wherein the first filtered manifest data and the second filtered manifest data are compatible with different versions of the lookup table.

18. The system of claim 13, wherein the playback mode information is represented in the first master manifest data and the second master manifest data by one or more elements delimited by a tag in a markup language, or the playback mode information is represented in the first master manifest data and the second master manifest data by one or more Boolean elements.

19. The system of claim 13, wherein the first master manifest data or the second master manifest data includes a playback bitrate with no associated playback mode information.

20. The system of claim 13, wherein validation logic for insertion of secondary content into the first media content or second media content is bypassed in response to determining that a requested playback mode is the download playback mode.

* * * * *